(No Model.) 3 Sheets—Sheet 1.
W. R. PARNELL.
COMBINED CULTIVATOR AND PLANTER.
No. 363,299. Patented May 17, 1887.
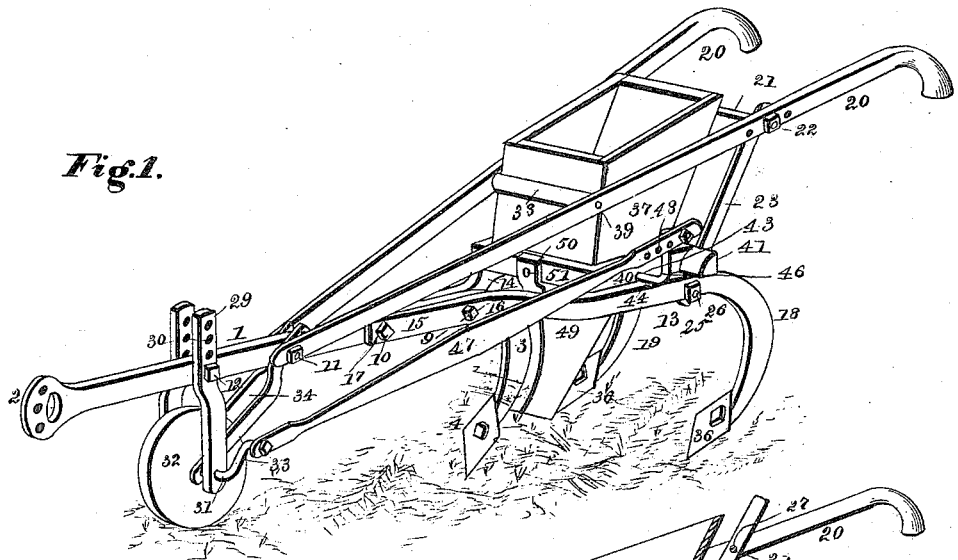
Witnesses
Inventor
William R. Parnell,
By his Attorneys (No Model.) 3 Sheets—Sheet 2.

W. R. PARNELL.
COMBINED CULTIVATOR AND PLANTER.

No. 363,299. Patented May 17, 1887.

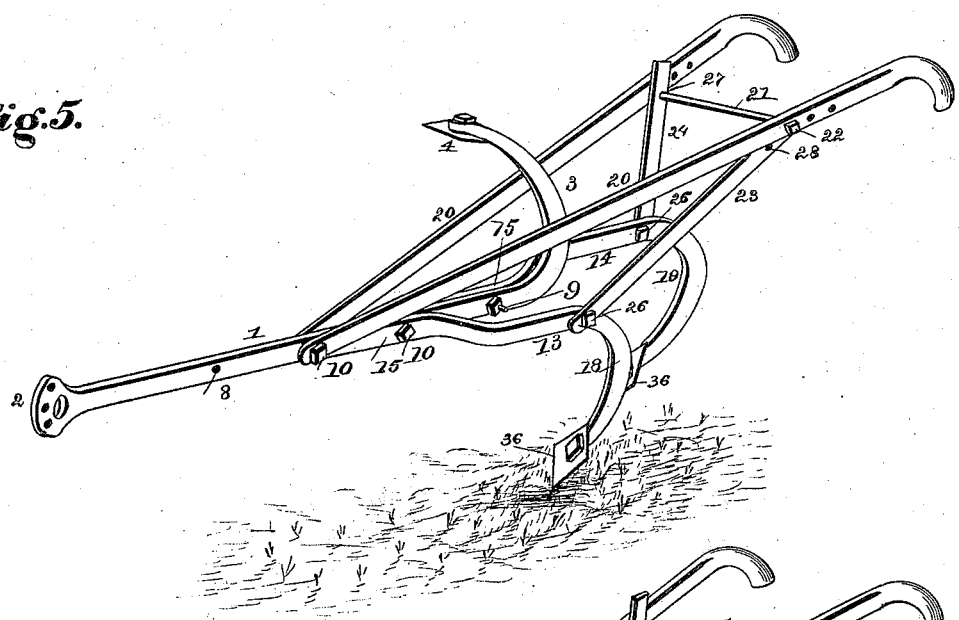
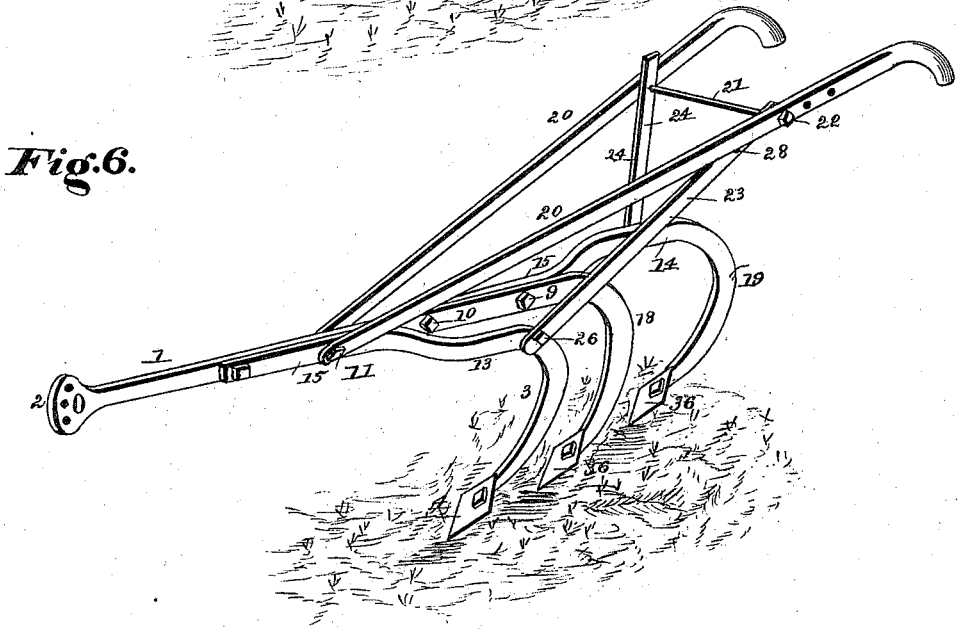

UNITED STATES PATENT OFFICE.

WILLIAM R. PARNELL, OF BINNSVILLE, MISSISSIPPI, ASSIGNOR OF ONE-HALF TO WILLIAM D. McNEILL, OF SAME PLACE.

COMBINED CULTIVATOR AND PLANTER.

SPECIFICATION forming part of Letters Patent No. 363,299, dated May 17, 1887.

Application filed November 27, 1886. Serial No. 220,026. (No model.)

*To all whom it may concern:*

Be it known that I, WILLIAM R. PARNELL, a citizen of the United States, and a resident of Binnsville, in the county of Kemper and State of Mississippi, have invented certain new and useful Improvements in Combined Cultivators and Planters; and I do hereby declare that the following is a full, clear, and exact description of the invention, which will enable others skilled in the art to which it appertains to make and use the same, reference being had to the accompanying drawings, which form a part of this specification, and in which—

Figure 3:
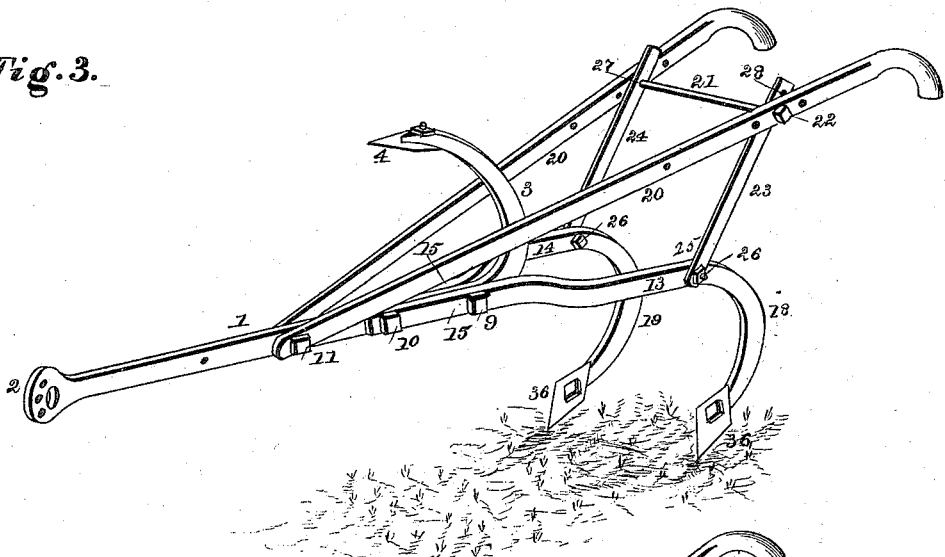
Figure 4:
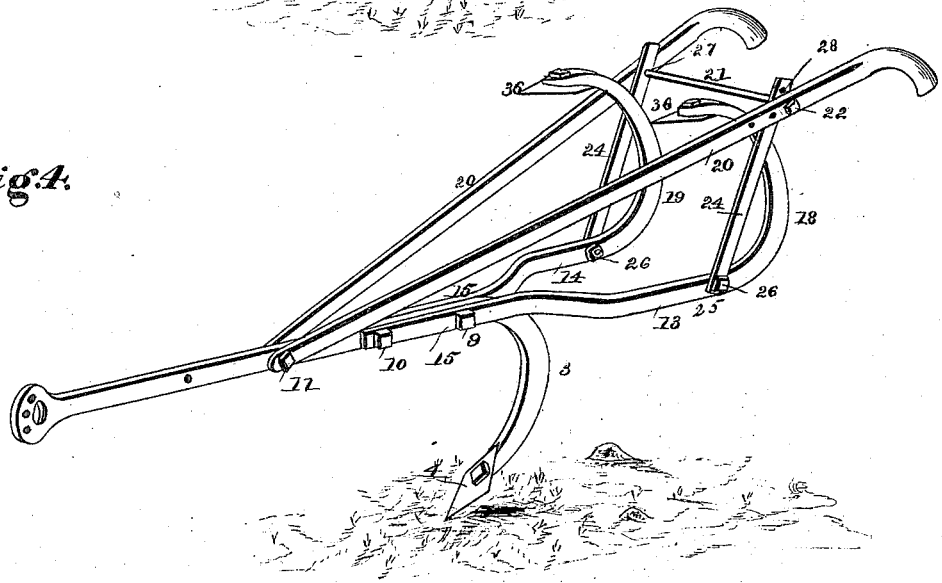

Figure 1 is a perspective view of my improved combined cultivator and seeding-machine, showing it used as a seeding-machine. Fig. 2 is a longitudinal vertical sectional view of the same. Fig. 3 is a view showing the implement converted into a cultivator having two shovels in a straight transverse line. Fig. 4 is a similar view showing the implement converted into a single-shovel cultivator. Fig. 5 is a view showing the implement converted into a cultivator having two shovels in an oblique line. Fig. 6 is a view showing the implement converted into a cultivator having three shovels in an oblique line; and Fig. 7 is a top view of the implement with the seed-box removed, but with the standards in the same position as shown in Fig. 1.

Similar numerals of reference indicate corresponding parts in all the figures.

My invention has relation to that class of convertible cultivators in which the beams and standards may be changed so as to form cultivators for different purposes, and in which a seed-box may be secured upon the frame for the purpose of converting the cultivator into a seeding-machine; and it consists in the improved construction and combination of parts of such a cultivator, which may have its standards and beams exchanged so as to place the shovels in different positions, and which may be converted into either a corn-planter or a cotton-planter, as hereinafter more fully described and claimed.

In the accompanying drawings, the numeral 1 indicates the main or central beam, which is provided at its forward end with a clevis, 2, and has its rear end curved to form a standard, 3, to the lower end of which a shovel, 4, of any suitable shape or construction may be secured. The main beam is formed with four equidistant perforations, 5, 6, 7, and 8, and suitable nutted bolts, 9, 10, 11, and 12, are inserted into these perforations. The side beams, 13 and 14, are formed with straight forward portions, 15, having two perforations, 16 and 17, having the same distance between them as the perforations in the central beam, and the rear portions of the beams are curved slightly to the sides, so as to bring the downwardly-curved standards 18 and 19 to stand in planes at both sides of the central beam.

Two handles, 20, are secured with their forward ends to the central beam by means of the bolt passing through the forward of the equidistant perforations, and the rear portions of the handles are connected by means of a cross-piece, 21, having screw-threaded ends provided with nuts 22.

Braces 23 and 24 are secured with their lower perforated ends to the rear perforations, 25, in the side beams by means of nutted bolts 26, and have their upper ends secured to the cross-bar inside of the handles, the braces having perforations 27 and 28 at their upper ends, the brace 23 at one side having one perforation, 27, while the other brace, 24, is provided with two perforations, 28.

Two standards, 29, are formed with series of perforations 30 at their upper ends, and are secured by means of the nutted bolt 12 in the perforations 8 to the main beam, and the lower ends of these standards have a shaft, 31, journaled in them, the said shaft having a wheel, 32, upon its middle between the standards, and having a crank, 33, at one end.

Two inclined braces, 34, have the shaft journaled in their lower ends, having bearings registering with the bearings in the vertical standards, and have series of perforations 35 in their upper ends, with which they are secured to the bolt 11 in the perforation 7 inside of the forward ends of the handles.

When it is desired to have the central shovel forward of the two side shovels, 36, the beams are secured as shown in Figs. 1, 2, and 7, having their perforations secured upon the bolts in the rear portion of the central beam; but if is desired to have the three shovels standing in an oblique line one of the side beams is moved forward, and has its perforations secured upon the two foremost of the equidistant bolts, as shown in Fig. 6.

If it is desired to have two shovels in an oblique line, the central beam and standard are inverted, as shown in Fig. 5, while the side beams remain in the same position, as shown in Fig. 6, and when the beams are secured in the two last-mentioned forms the rear brace for one of the side beams has its uppermost perforation secured to the cross-bar as the said side beam is moved forward, requiring a longer brace.

When the side beams are to have their shovels in a straight transverse line, the central beam is inverted, with its standard projecting upward, as shown in Fig. 3, while the side beams have their perforations secured upon the two rear bolts of the main beam, and when the cultivator is to be converted into a plow or cultivator having only one standard the side beams are inverted and their standards pointed upward, as shown in Fig. 4.

The wheel and its standards and braces may be removed, if desired, the wheel simply serving to support the forward end of the central beam and to lighten the draft on the plow or cultivator; and it will be seen that the said wheel may be raised or lowered at will by changing the bolts securing it to the beam in the perforations in the upper ends of the standards and braces.

When the implement is converted into a seeding-machine, the beams are arranged as shown in Figs. 1, 2, and 7, the side beams being secured upon the two rearmost bolts in the middle beam, and a seed-box, 37, is placed between the handles and between the rear portions of the side beams. This seed-box is provided at its forward side with a cross-piece, 38, the ends of which fit into perforations 39 in the handles, and the lower end of the seed-box is provided with flanges 40, which rest upon the side beams, the rear flange being formed by a cross-piece, 41, resting upon the side beams with its projecting ends.

Two bars, 42, are secured removably to the sides of the under side of the seed-box, and transverse bearings 43 are formed between these bars and the bottom of the seed-box, in which bearings a transverse shaft, 44, is journaled, which shaft is provided at its middle with a disk, 45, projecting up through a longitudinal slot in the bottom of the seed-box, and at one end with a crank, 46, to which is pivoted a connecting-rod, 47, having a series of perforations, 48, fitting upon the crank, and pivoted at its forward end to the crank upon the wheel-shaft, the crank upon the shaft for the seed-disk being longer than the crank upon the wheel-shaft, so that the disk will be rocked when the reel is revolved. A flat spout, 49, fits with its side pieces at both sides of the lower half of the seed-disk, and has two upwardly-projecting lips, 50, at its forward and rear side, by means of which lips the spout is secured to the forward and rear side of the lower end of the seed-box, being secured by means of bolts 51, passing through the lips. The spout has its forward side concaved and curved to fit to the rear edge of the central standard, so that the seed passing through the spout may be dropped directly in the furrow formed by the shovel upon the said standard.

Two plates, 52, fit upon bolts in the bottom of the seed-box, bearing with their inner edges against the sides of the seed-disk, being adjustable upon the bolts.

One half of the periphery of the seed-disk is formed with seed-cups 55, which may alternately be rocked into the seed-box and below the bottom of the same as the shaft is rocked, and the other half of the disk has a portion cut away, as shown at 56, and curved teeth 57 are secured in this cut-away portion, and may be brought to project into the seed-box by inverting the disk when the machine is to be used for planting cotton-seed.

It will thus be seen that in one implement are combined various implements for preparing the ground and for planting corn or similar seed, or for planting cotton, and that the implement may be changed in a short space of time into any of its forms by simply using a wrench for unscrewing and again securing the nuts upon the various fastening-bolts which secure the parts of the implement.

Shovels, plows, or blades of different shapes may be used upon the standards, according to the class of work desired to be done, and the said shovels, plows, or blades may be secured to the standards in any desired manner and by any desired means.

Having thus described my invention, I claim and desire to secure by Letters Patent of the United States—

1. The combination of a central beam having a downwardly-curved standard at its rear end and having four equidistant perforations provided with nutted bolts, with side beams having downwardly-curved standards and having their rear portions curved to the sides and again rearward and formed each with two perforations in the forward ends, having the same distance between them as the bolts in the central beam, as and for the purpose shown and set forth.

2. The combination of a central beam having a downwardly-curved standard at its rear end and having four equidistant perforations in its rear portion provided with nutted bolts, side beams having downwardly-curved standards and having their rear portions curved to the side and again straightened rearward and formed in their forward portions with two perforations fitting upon two of the nutted bolts of the central beam, and handles having their forward ends secured to the forward bolt of the central beam and having braces at their rear ends secured with their upper ends to a cross-piece and with their lower ends to the rear portions of the side beams, as and for the purpose shown and set forth.

3. The combination of a beam having suitable standards at its rear end and having two perforations near the forward end provided with nutted bolts, a pair of upright standards having bearings at their lower ends and series of perforations in their upper ends fitting upon the forward bolt in the beam, inclined braces having bearings in their lower ends and having series of perforations in the upper ends fitting upon the rear bolt of the beam, and a wheel having its shaft journaled in the bearings of the standards and braces, as and for the purpose shown and set forth.

4. The combination of a central beam having a downwardly-curved standard at its rear end and having two side beams secured to its rear portion, formed with their rear portions bent to the sides and again rearward, and two handles projecting obliquely rearward, with a seed-box secured between the rear portions of the side beams and between the handles, and having a spout projecting to the rear of the central standard and having a rocking crank-shaft provided with a reversible seed-disk in the seed-box, and a wheel journaled between standards at the forward end of the beam and having a crank provided with a connecting-rod pivoted to the crank of the seed-shaft, as and for the purpose shown and set forth.

In testimony that I claim the foregoing as my own I have hereunto affixed my signature in presence of two witnesses.

WILLIAM R. PARNELL.

Witnesses:
W. D. McNEILL,
JAS. E. HART.